United States Patent [19]

Prince et al.

[11] 4,019,941
[45] Apr. 26, 1977

[54] METHOD OF CONSTRUCTING CONVEYOR BELTING

[75] Inventors: Eric Victor Donald Prince, Bulleen; Kenneth Llewellyn Lewis, Doncaster; Leonard John Michael Ralph, Essendon, all of Australia

[73] Assignee: Dunlop Australia Limited, Port Melbourne, Australia

[22] Filed: Feb. 28, 1975

[21] Appl. No.: 553,981

[30] Foreign Application Priority Data

Mar. 18, 1974 Australia .................... 6939/74

[52] U.S. Cl. .................... 156/179; 74/231 P; 156/330; 156/333; 198/847; 198/957; 260/837 PV; 264/174; 264/177 R; 264/248; 264/271; 427/207 A; 427/410

[51] Int. Cl.² .................... B29C 27/30; B32B 27/30; B32B 27/38; C09J 7/00

[58] Field of Search ............ 198/193, DIG. 7, 847; 156/179, 330, 333, 293, 297, 303.1, 137–142, 244, 243, 161, 196, 209, 309; 74/231 R, 231 P, 232; 260/837 PV; 427/207 A, 207 C, 207 D, 410; 428/294, 416, 457, 463, 520; 264/248, 259, 174, 176 R, 177 R, 263, 271

[56] References Cited

UNITED STATES PATENTS

| | | | |
|---|---|---|---|
| 2,439,043 | 4/1948 | Evans | 156/293 X |
| 3,049,460 | 8/1962 | Garbin et al. | 74/232 X |
| 3,323,637 | 6/1967 | Jenkins | 198/193 |
| 3,335,843 | 8/1967 | Duvivier et al. | 198/193 |
| 3,481,807 | 12/1969 | Kanamori | 198/193 X |
| 3,498,684 | 3/1970 | Hallaman | 198/193 X |
| 3,615,152 | 10/1971 | Bouzat et al. | 198/193 |
| 3,634,169 | 1/1972 | Garnish | 260/837 PV X |
| 3,676,398 | 7/1972 | D'Alelio | 156/330 X |
| 3,700,012 | 10/1972 | Alderfer | 156/179 X |
| 3,804,724 | 4/1974 | Bolger et al. | 156/330 X |
| 3,809,594 | 5/1974 | Taylor-Brown et al. | 156/179 X |

*Primary Examiner*—Douglas J. Drummond
*Assistant Examiner*—Thomas Bokan

[57] ABSTRACT

A method of producing steel reinforced conveyor belting wherein the steel reinforcing cords are located in grooves formed between the mating faces of two layers of P.V.C. based material. The faces of the grooves are coated with an adhesive having a P.V.C. base including an epoxy resin and curing agent and the steel cords are adhered to the layers of P.V.C. by curing the assembly of cords and cover layers under heat and pressure.

12 Claims, No Drawings

METHOD OF CONSTRUCTING CONVEYOR BELTING

This invention relates to a method of constructing conveyor belting reinforced with steel cords.

Steel cord reinforcement conveyor belting has been known for many years wherein the body of the belting is constructed from thermosetting elastomers such as N.R., S.B.R., Chloroprene and Nitrile. These conveyor belts are normally produced by building up layers of the above materials with an adhesive component therebetween on opposite sides of the steel cords to form a sandwich. The sandwich is then pressed in a cooled and uncured condition to form a pre-moulded belt mass which is subsequently vulcanised in a belt moulding press at elevated temperature. This process is quite successful with thermosetting elastomers as the materials are readily deformable in the cold press so as to flow about the steel cords.

Although it has been realized that conveyor belts made of polyvinyl chloride (P.V.C.) reinforced with steel cords were desirable, to date such belts have not been commerically produced due to problems inherent with the use of P.V.C. Because P.V.C. is a thermoplastic material it is not possible to produce a pre-moulded belt mass with the steel cords sandwiched between layers of P.V.C. prior to final moulding of the belt in a belt moulding press. Any attempt to press the cool P.V.C. layers against the cords so as to encase the latter in the P.V.C. normally caused a fracturing of the P.V.C. layer due to its inability to cold flow to the same degree as an unvulcanised elastomeric composition.

It is therefore the principal object of the present invention to provide an adhesive system for bonding P.V.C. to metal and in a more specific form to provide a method of producing steel cord reinforced conveyor belting using P.V.C. as the cover material and which overcomes the above stated difficulties.

With this object in view there is provided a method of bonding a layer of P.V.C. to a metal component comprising applying a layer of adhesive having a P.V.C. base and including an epoxy resin and a curing agent between the P.V.C. layer and the surface, and curing the assembly under heat and pressure.

More specifically there is provided a method of producing steel cord reinforced conveyor belt comprising forming two cover layers of P.V.C. based material with a plurality of longitudinally extending grooves formed in one face of at least one layer, the grooves being shaped and arranged so that when the two layers are assembled with said one face abutting a face of the other layer there is formed a plurality of longitudinal apertures, assembling the two layers to form said apertures with a steel cord in at least some of the said apertures so formed and with a coating of adhesive having a P.V.C. base and including an epoxy resin and a curing agent between each cord and the wall of the aperture that the cord is disposed in, and curing the assembly under heat and pressure.

Preferably grooves are formed in one face of each cover layer of P.V.C. with the grooves on each face registering on assembly of the layers. The grooves may also be arranged so that the grooves in one layer register with an ungrooved portion of the other layer. Conveniently the adhesive is applied in the form of a coating onto the walls of the grooves prior to assembling of the layers of P.V.C,. to the steel cords. The adhesive may be applied to the grooves by extrusion thereof into the grooves either during, or subsequent to the extruding of the grooved layers of P.V.C. Alternatively the adhesive may be produced in the form of sheets, and a sheet of the adhesive placed between the cords and each layer of P.V.C. during assembly so that the adhesive will be pressed into the grooves abutting the cords upon the initial closing of the press during curing.

Preferably the adhesive comprises a dry blend of P.V.C. liquid or solid epoxy resin and a resin curing agent such as dicyandiamide or melamine, preferably in the proportions of 10 parts of epoxy resin to 100 parts of P.V.C., plasticizer, filler and stabiliser as required. However the percentage of epoxy resin in the adhesive may vary depending on the resin selected and the desired final bond strength between the cords and the adhesive layer. Effective results are achieved with 5 to 60 parts by weight of epoxy resin to 100 parts of P.V.C. The epoxy resin is based on diglycidyl ether and bis-phenol A resins. The curing agent for the epoxy resin is selected so that curing will only take place at a temperature above the extruding or milling temperature i.e. the well-known fluxing temperature, of the P.V.C., preferably at a temperature of the order of 170° C, thus ensuring a long shelf life for the adhesive.

Adhesion between the steel cords and the P.V.C. cover is believed not to be due to mechanical keying alone, although an increase in adhesion does occur with an increase in cured hardness.

In the laboratory the following adhesives have been used:

Example 1

| | | |
|---|---|---|
| P.V.C. | (Goodrich Geon 101) | 100 |
| Plasticiser | (Rohn Haas Paraplex G62) | 20 |
| Epoxy Resin | (Shell Chemicals Epikote 828) | 7.5 |
| Whiting | | 10 |
| White Lead Paste | (White lead to D.O.P. 4:1) | 8 |
| Dicyandiamide | | 0.7 |

To aid dispersion, the dicyandiamide was dissolved in methyl cellosolve before adding to the mixture of epoxy resin and plasticiser (which was an epoxidised soya bean oil in this case). The liquids were then mixed into the powders and stabiliser. The solvent evaporated during subsequent hot milling — one roll was at 148° C and the other at 139° C.

After about 5 minutes milling a band was formed and the compound removed as a sheet approx. 0.035 inch thick. A layer of this adhesive was placed either side of a plurality of stranded steel wires and the balance of the finished thickness was made up of layers of P.V.C. cover compound to a total thickness of ½ inch. Curing was done in a press for 17 minutes at 170° C followed by water cooling. The wire was brass plated steel wire 0.16 inch dia., construction 7 × 2 × 3, and under test the wire pull-out load was 1060 lb/2 inch.

Example 2

| | | |
|---|---|---|
| P.V.C. | (Geon 101) | 100 |
| Plasticiser | (Reichhold Chemicals Peroxidol 780) | 20 |
| Epoxy Resin | (Epikote 828) | 60 |
| Omya BSH | (Pluess Staufer) | 50 |
| White Lead Paste | | 8 |

Example 2-continued

| | | |
|---|---|---|
| Dicyandiamide | | 5 |

The same mixing and moulding procedure was used as in Example 1. Under test with this adhesive the pull-out load with brass plted wire was 1250 lb/2 inch, and 890 lb/2 inch, for zinc plated 0.16 inch dia. 7 × 19. When this compound was used alone to form a belt the pull-out on brass plated wire exceeded 1720 lb/2 inch, and on zinc plated wire 1370 lb/2 inch.

Example 3

| P.V.C. | (Geon 101) | 100 |
|---|---|---|
| Plasticiser | (Paraplex G62) | 20 |
| Epoxy Resin | (Epikote 828) | 15 |
| Whiting | | 10 |
| Dicyandiamide | | 1.3 |
| White Lead Paste | | 8 |

Using similar mixing and moulding conditions, as in Examples 1 and 2 adhesion to brass coated wire was 1625 lb/2 inch and to zinc coated 1620 lb/2 inch.

In a preferred form of the invention the layers of P.V.C. which will form the cover material of the conveyor belt are extruded with the appropriate arrangement of longitudinal grooves formed in one face. The extruder includes a second die which extrudes a thin layer of the dry bonded adhesive onto the walls of each groove simultaneous with the forming of the groove. The P.V.C. cover may be extruded in a strip form or if desired, may be extruded in the form of a tube with grooves formed in either the internal or external wall of the tube, and the tubing subsequently split longitudinally. When the P.V.C. is extruded in a tubular form it is possible to also extrude dry bonding adhesive onto the walls of the grooves.

The pre-prepared strips of grooved P.V.C. are then assembled one on each side of a plurality of tensioned steel wires so that the wires are sandwiched between the layers of P.V.C. and located within the apertures formed by the grooves in the respective layers of P.V.C. The steel wires are preferably coated with zinc or brass to improve the bonding strength and prevent corrosion. The steel wires are tensioned in the conventional manner prior to the assembly of the grooved layers of P.V.C. thereto. The resulting assembly is then pressed between heated dies such as in a conventional belt press to finalize bonding of the two layers together and to the steel cords, and to impart the desired finished shape to the belt.

The preceding description and examples are particularly directed to producing conveyor belt but it will be appreciated that the same adhesive system may be applied for bonding P.V.C. to any metal component and particularly brass or zinc plated metal components.

We claim:

1. A method of producing steel cord reinforced conveyor belt comprising forming two cover layers of P.V.C. based material with a plurality of longitudinally extending grooves formed in one face of at least one layer, the grooves being shaped and arranged so that when the two layers are assembled with said one face abutting a face of the other layer there is formed a plurality of longitudinal apertures, assembling the two layers to form said apertures with a steel cord in at least some of the said apertures so formed and with a coating of adhesive having a P.V.C. base and including an epoxy resin and an epoxy resin curing agent between each cord and the wall of the aperture that the cord is disposed in, and curing the assembly under heat and pressure.

2. A method as claimed in claim 1 wherein longitudinally extending grooves are formed in one face of each layer, the grooves being arranged so that when the layers are assembed with the grooved faces abutting respective grooves in each layer register to form the longitudinal grooves.

3. A method as claimed in claim 1 wherein longitudinally extending grooves are formed in one face of each layer the grooves being arranged so that when the layers are assembled with the grooved faces abutting the grooves in each layer register with an ungrooved portion of the other layer to form the longitudinal grooves.

4. A method as claimed in claim 1 wherein the epoxy resin and resin curing agent comprises 5% to 25% by volume of the adhesive.

5. A method as claimed in claim 1 wherein the epoxy resin curing agent is substantially inactive at the fluxing temperature of P.V.C.

6. A method as claimed in claim 1 wherein the cover layers are formed by extrusion and the grooves are formed during extrusion of the layers.

7. A method as claimed in claim 1 wherein the coating of adhesive is extruded onto the walls of the grooves prior to assembly of the cover layers to the cords.

8. A method as claimed in claim 1 where the cords are stranded steel wire.

9. A method as claimed in claim 2 wherein a sheet of adhesive is interposed between each cover layer and the cords during formation of the assembly and portion of the respective sheets is pressed into the grooves in the adjacent sheet on the application of the pressure during curing.

10. A method as claimed in claim 3 wherein a sheet of the adhesive is interposed between each cover layer and the cords during formation of the assembly and a portion of the respective sheets is pressed into the grooves in the adjacnet sheet upon the application of the pressure during curing.

11. A method as claimed in claim 6 wherein the adhesive coating is extruded onto the walls of the grooves during the formation of the grooves prior to the assembly of the cover layer to the cords.

12. A method of binding a layer P.V.C. to a metal component comprising applying a layer of adhesive having a P.V.C. base and including an epoxy resin and an epoxy resin curing agent between the P.V.C. layer and the metal, and curing the assembly under heat and pressure.

* * * * *